(12) United States Patent
Shioguchi et al.

(10) Patent No.: US 12,073,069 B2
(45) Date of Patent: Aug. 27, 2024

(54) CONTROL VALUE SETTING DEVICE AND CONTROL VALUE SETTING PROGRAM

(71) Applicant: Faurecia Clarion Electronics Co., Ltd., Saitama (JP)

(72) Inventors: Takuma Shioguchi, Saitama (JP); Yuki Matsushita, Saitama (JP)

(73) Assignee: FAURECIA CLARION ELECTRONICS CO., LTD., Saitama (JP)

( * ) Notice: Subject to any disclaimer, the term of this patent is extended or adjusted under 35 U.S.C. 154(b) by 0 days.

(21) Appl. No.: 17/853,814

(22) Filed: Jun. 29, 2022

(65) Prior Publication Data

US 2023/0004285 A1 Jan. 5, 2023

(30) Foreign Application Priority Data

Jun. 30, 2021 (JP) ................................. 2021-108224

(51) Int. Cl.
*G06F 3/048* (2013.01)
*G06F 3/04847* (2022.01)
*G06F 3/04886* (2022.01)

(52) U.S. Cl.
CPC ...... *G06F 3/04847* (2013.01); *G06F 3/04886* (2013.01)

(58) Field of Classification Search
CPC ... G06F 3/04847; G06F 3/04886; G06F 3/048
See application file for complete search history.

(56) References Cited

U.S. PATENT DOCUMENTS

| 6,061,062 | A  | * | 5/2000  | Venolia  | G06F 3/0481 715/856 |
| 7,590,946 | B2 | * | 9/2009  | Okamura  | G06F 3/0482 715/830 |
| 8,402,391 | B1 | * | 3/2013  | Doray    | G06F 3/0481 715/834 |
| 9,261,989 | B2 | * | 2/2016  | Kuscher  | G06F 3/04883 |
| 9,983,767 | B2 | * | 5/2018  | Kim      | G06F 3/0482 |
| 2002/0163543 | A1 | * | 11/2002 | Oshikiri | G06F 3/0482 715/810 |

(Continued)

FOREIGN PATENT DOCUMENTS

CN 103713809 A * 4/2014
JP 2016-126512 A 7/2016

*Primary Examiner* — Rashawn N Tillery
(74) *Attorney, Agent, or Firm* — FOLEY & LARDNER LLP

(57) ABSTRACT

A control value setting device for setting a control value for controlling a predetermined function includes: a position acquisition unit that acquires a user's touch position and a detach position with respect to a touch operation-enabled region within a screen; an area display unit that, when the touch position is acquired by the position acquisition unit, displays control value setting areas partitioned into a plurality of first areas corresponding to the different control values in the area according to the acquired touch position in the area; and a control value setting unit that sets a control value associated with a first area including the acquired detach position when the detach position is acquired in the first area by the position acquisition unit. The plurality of first areas includes parts lined in at least a predetermined direction in an equal size.

6 Claims, 9 Drawing Sheets

(56) References Cited

U.S. PATENT DOCUMENTS

| | | | |
|---|---|---|---|
| 2005/0033782 A1* | 2/2005 | de Brebisson | G06F 15/025 708/171 |
| 2008/0244454 A1* | 10/2008 | Shibaike | G06F 3/0488 715/835 |
| 2009/0013254 A1* | 1/2009 | Walker | G06F 3/167 715/727 |
| 2009/0237421 A1* | 9/2009 | Kim | G06F 3/0485 345/173 |
| 2010/0100849 A1* | 4/2010 | Fram | G06F 3/04812 715/702 |
| 2010/0250071 A1* | 9/2010 | Pala | G06F 3/016 341/20 |
| 2010/0275150 A1* | 10/2010 | Chiba | G06F 3/0488 715/788 |
| 2010/0281379 A1* | 11/2010 | Meaney | G11B 27/031 715/723 |
| 2011/0082627 A1* | 4/2011 | Small | B60K 35/10 345/173 |
| 2013/0047112 A1* | 2/2013 | Waller | B60H 1/00985 715/764 |
| 2013/0212535 A1* | 8/2013 | Kim | G06F 3/04883 715/841 |
| 2014/0033129 A1* | 1/2014 | Huang | G06F 3/0488 715/835 |
| 2014/0075388 A1* | 3/2014 | Kuscher | G06F 3/04883 715/834 |
| 2015/0204569 A1* | 7/2015 | Lorenz | F24F 11/62 700/278 |
| 2015/0234566 A1* | 8/2015 | Kanda | G06F 3/04847 345/157 |
| 2015/0324087 A1* | 11/2015 | Gregory | G06F 3/013 345/174 |
| 2015/0324565 A1* | 11/2015 | Park | G06F 3/041 726/19 |
| 2015/0328958 A1* | 11/2015 | Winget, Jr. | B60H 1/00742 454/155 |
| 2016/0062626 A1* | 3/2016 | Kubota | G06F 3/04886 715/716 |
| 2016/0202869 A1* | 7/2016 | Kim | G06F 3/0488 715/841 |
| 2016/0291857 A1* | 10/2016 | Park | G06F 3/0488 |
| 2016/0328134 A1* | 11/2016 | Xu | G06F 3/04847 |
| 2016/0347151 A1* | 12/2016 | Arakawa | B60H 1/0065 |
| 2017/0134714 A1* | 5/2017 | Soni | H04N 13/189 |
| 2017/0153771 A1* | 6/2017 | Chu | G06F 3/0482 |
| 2017/0197491 A1* | 7/2017 | Nakano | G06F 3/04847 |
| 2018/0065558 A1* | 3/2018 | Matsuyama | B60K 35/00 |
| 2018/0174617 A1* | 6/2018 | Shore | G06Q 30/0631 |
| 2019/0041652 A1* | 2/2019 | Murayama | G02B 27/0149 |
| 2019/0187797 A1* | 6/2019 | Nakamura | G06F 3/0488 |
| 2019/0342968 A1* | 11/2019 | Weber | G06F 3/04847 |
| 2020/0026420 A1* | 1/2020 | Sicard | H05B 47/115 |
| 2020/0249786 A1* | 8/2020 | Boss | G06F 3/0482 |
| 2020/0331321 A1* | 10/2020 | Yamashita | B60H 1/00778 |
| 2022/0147233 A1* | 5/2022 | Trabucco | G06F 3/04847 |
| 2022/0350473 A1* | 11/2022 | Takashiro | B60K 35/00 |

\* cited by examiner

CONTROL VALUE SETTING DEVICE AND CONTROL VALUE SETTING PROGRAM

CROSS-REFERENCE TO RELATED APPLICATION

This application claims the benefit of and priority to Japanese Application No. 2021-108224, filed on Jun. 30, 2021, the entire disclosure of which is hereby incorporated by reference herein.

FIELD OF TECHNOLOGY

The present disclosure relates to a control value setting device and control value setting program.

BACKGROUND

There are known control value setting devices wherein control values for controlling predetermined functions are set using a touch panel. A specific structure for this type of control value setting device is described in, for example, Japanese Patent Application Publication No. 2016-126512 ("Patent Document 1").

In the control value setting device described in Patent Document 1, when a touch by a user on a touch panel is detected, a virtual controller is displayed on a screen based on the touch position. The control value setting device sets a control value for a predetermined function in response to an amount of sliding, on the virtual controller, of a finger, or the like, of the user who made the touch.

SUMMARY

With the control value setting device set forth in Patent Document 1, when the touch position is near an end of the screen, then even if the sliding distance is the same, when sliding toward the screen end side the amount of change in the control value by the sliding operations will be greater than when sliding away from the screen end side. Because the amount of change in the control value varies depending on the direction in which the finger is slid, it is difficult for the user to set the control value as intended when the state is one wherein the user cannot view the screen.

The present disclosure was created in contemplation of the above, and an object thereof is to improve the ease of operations when setting a control value in a control value setting device and control value setting program for setting a control value for controlling a predetermined function.

A control value setting device according to one embodiment is a device for setting a control value for controlling a predetermined function, comprising: a position acquisition unit that acquires a user's touch position and a detach position with respect to a touch operation-enabled region within a screen: an area display unit that, when the touch position is acquired by the position acquisition unit, displays control value setting areas partitioned into a plurality of first areas corresponding to the different control values in the area according to the acquired touch position in the area: and a control value setting unit that sets a control value associated with a first area including the acquired detach position when the detach position is acquired in the first area by the position acquisition unit. The plurality of first areas includes parts lined in at least a predetermined direction in an equal size.

The control value setting device and control value setting program according to one embodiment improves the ease of operations when setting a control value.

DETAILED DESCRIPTION

A control value setting device and control value setting program according to one embodiment will be explained below.

The control value setting device according to one embodiment is an on-vehicle device such as, for example, a car audio or navigation device. Note that the control value setting device is not limited to being an on-vehicle device, but may be a device in another form, such as a smart phone, a feature phone, a tablet terminal, a Personal Computer (PC), a Personal Digital Assistant (PDA), a Portable Navigation Device (PND), a portable game machine, or the like.

Figure 1:
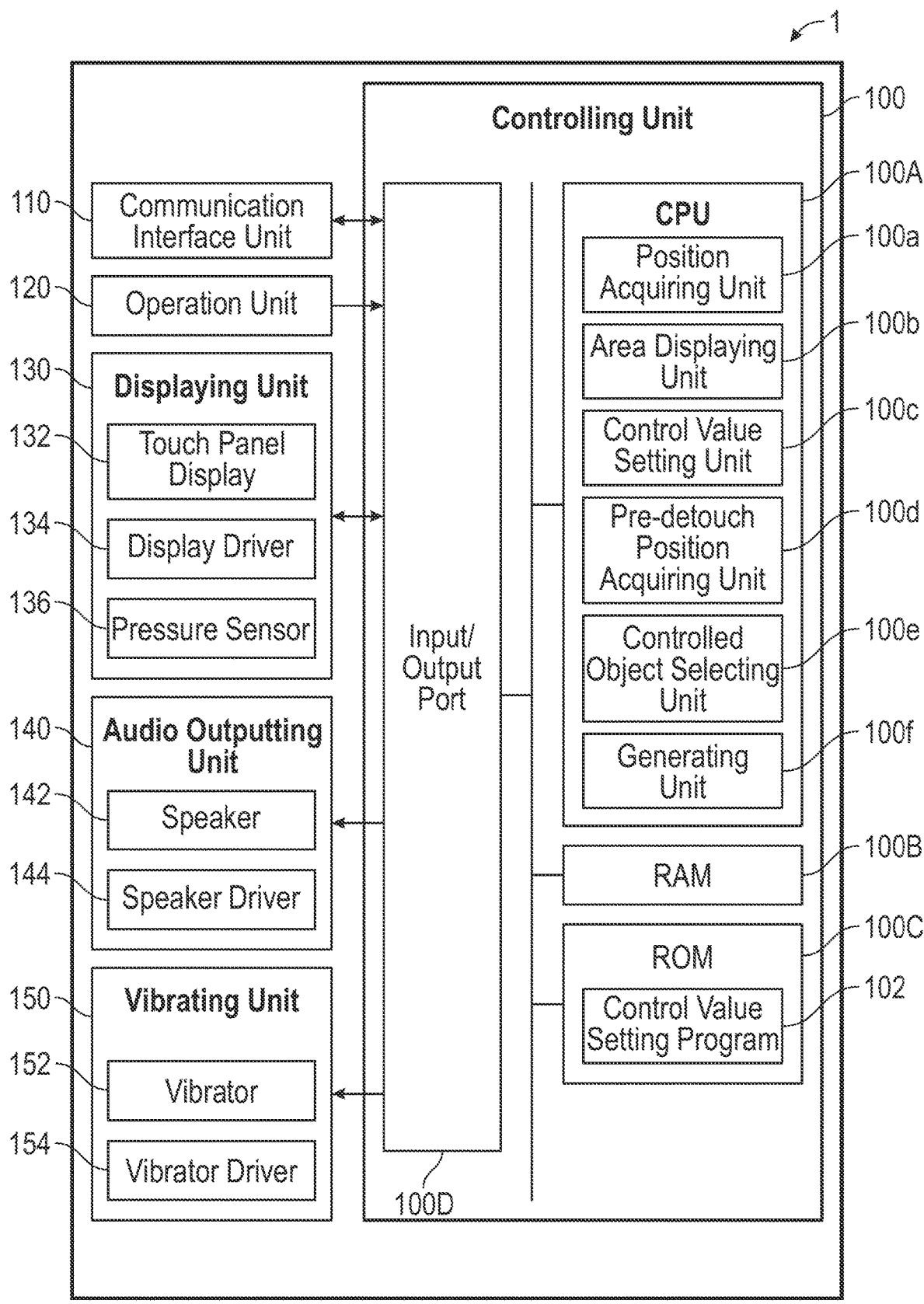
FIG. 1 is a block diagram showing the structure of a control value setting device according to one embodiment.

FIG. 1 is a block diagram showing the structure of a control value setting device 1 according to one embodiment.

As shown in FIG. 1, the control value setting device 1 comprises a controlling unit 100, a communication interface unit 110, an operating unit 120, a displaying unit 130, an audio outputting unit 140, and a vibrating unit 150. Note that the main structural elements required for explaining the present embodiment are shown in FIG. 1, where illustrations of some structural elements that are essential structural elements for the control value setting device 1, such as the case, for example, are omitted arbitrarily.

The controlling unit 100 is that which controls the entirety of the control value setting device 1, and is a microcomputer made from a Central Processing Unit (CPU) 100A, a Random Access Memory (RAM) 100B, a Read-Only Memory (ROM) 100C, an input/output port 100D, and bus lines, and the like, for connecting these ports.

The CPU 100A reads in a program that is stored in the ROM 100C, to control the control value setting device 1 following the program that has been read in. The CPU 100A comprises, as functional blocks, a position acquiring unit 100a, an area displaying unit 100b, a control value setting unit 100*c*, a pre-detouch position acquiring unit 100*d*, a controlled object selecting unit 100*e*, and a generating unit 100*f*.

The RAM 100B is a storing unit for storing programs and data temporarily, providing a work area. The RAM 100B is, for example, a Dynamic Random Access Memory (DRAM).

The ROM 100C is a non-volatile memory for storing various types of programs and data, including a control value setting program 102. The ROM 100C is, for example, a flash memory.

The control value setting program 102 that is stored in the ROM 100C is a program for setting control values for controlling predetermined functions, and causes the CPU 100A, which is a computer, to execute: a position acquiring step for acquiring a user touch position on a touch operation-enabled region within a screen; an area displaying step for displaying, in the region, a control value area that is partitioned into a plurality of first areas that are assigned corresponding to control values that are different from each other, depending on the touch position acquired within the region, upon acquisition of the touch position in the position acquiring step; and a control value setting step for setting, upon acquisition of a user detouch position in a first area, a control value that corresponds to the first area that includes the detouch position. The plurality of first areas includes parts that are lined up with equal sizes in at least one predetermined direction. Execution of the control value setting program 102 improves the ease of operations when setting a control value. The details of the control value setting program 102 will be described below.

In the present embodiment, each functional block of the CPU 100A is achieved through a control value setting program 102, which is software. Note that some or all of the functional blocks of the CPU 100A may be achieved through hardware, such as a dedicated logic circuit.

The input/output port 100D is connected to the controlling unit 100 and to the other structural elements (specifically, the communication interface unit 110, the operating unit 120, the displaying unit 130, the audio outputting unit 140, and the vibrating unit 150).

The communication interface unit 110 is an interface that handles the process of communicating with another terminal device. Through the communication interface unit 110, the control value setting device 1 connects through a communication circuit that is a public circuit or a closed network, such as a Virtual Private Network (VPN), so as to enable communication with another terminal device.

The operating unit 120 is an operating member, such as a button, switch, or the like, by which the user operates the control value setting device 1.

The displaying unit 130 has a touch panel display 132 and a display driver 134 for driving the touch panel display 132. The touch panel display 132 is configured so as to enable touch operations on the entirety of a screen. The touch panel display 132 is structured using, for example, a Liquid Crystal Display (LCD) or organic Electro Luminescence (EL). A resistance film system, an electrostatic capacitance system, an ultrasonic surface elastic wave system, an infrared radiation optical imaging system, or an electromagnetic induction system is used in the touch panel display 132. A pressure sensor 136, for detecting the pressure of a touch on the screen (or, stated differently, a region whereon a touch operation is possible) is built into the touch panel display 132.

The audio outputting unit 140 has a speaker 142 and a speaker driver 144 for driving the speaker 142. Music or voice that is stored in, for example, the ROM 100C or a storage medium that is not shown (a Hard Disk Drive (HDD), a Solid State Drive (SSD), a removable memory card, or the like) is outputted from the speaker 142 through driving of the speaker 142 by the speaker driver 144.

The vibrating unit 150 has a vibrator 152 and a vibrator driver 154 for driving the vibrator 152. The vibrator 152 is structured using, for example, an Eccentric Rotating Mass (ERM), a Linear Resonant Actuator (LRA), a piezo element, or the like. The screen of the touch panel display 132 is vibrated by driving of the vibrator 152 by the vibrator driver 154.

Figure 2:
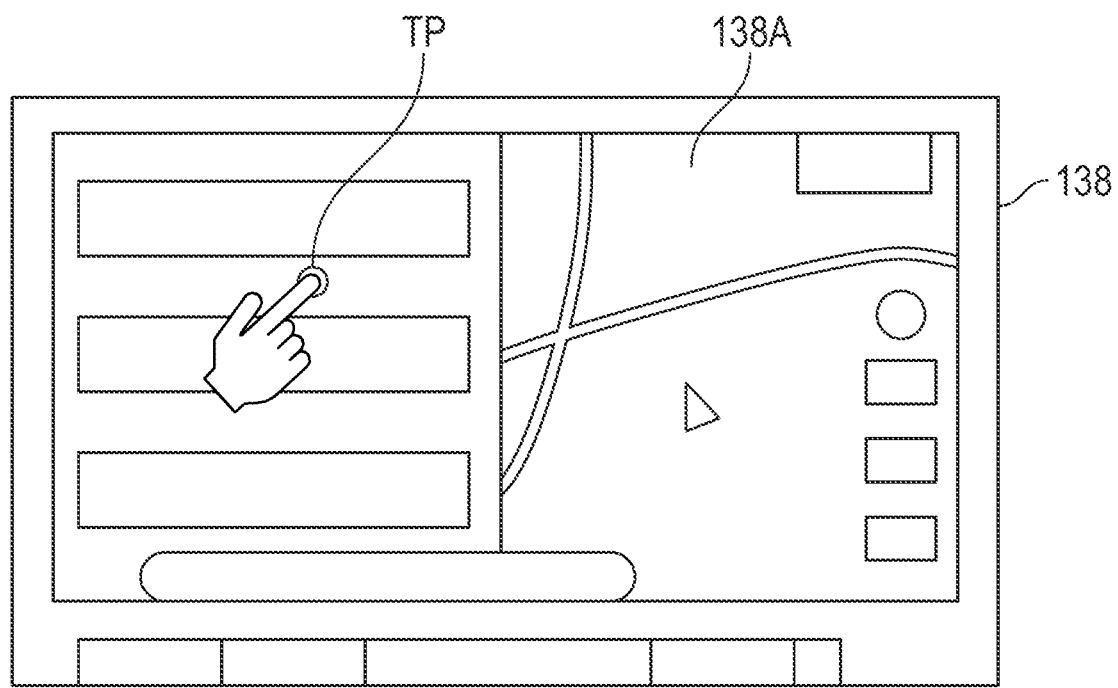
FIG. 2 is a diagram showing an example of an image that is displayed on the screen of a touch display panel in one embodiment.

FIG. 2 is a diagram showing an example of an image that is displayed on the screen 138 of the touch panel display 132. In the below, reference symbol 138A is assigned to the region of the screen 138 for which a touch operation by the user is possible. In the present embodiment, the entire screen 138 is the region 138A for which a touch operation is possible. Note that in each of the figures that show example image displays, including FIG. 2, an icon of a hand is shown to indicate the state of touching of the region 138A by the user. The position of the fingertip of this icon is the touch position TP by the user on the region 138A.

The user is able to set a control value for controlling a predetermined function through a touch operation on the region 138A. The predetermined function may be, for example, a temperature adjusting function or air flow rate adjusting function for the passenger compartment, a volume adjusting function for the speaker 142, a map thumbnail changing function for navigation, an air suspension vehicle height adjusting function, a seat massage intensity adjusting function, a seat heater temperature adjusting function, a drive mode switching function (switching to Snow Mode or Dirt Mode, switching between two-wheel drive and four-wheel drive, etc.), or the like.

The user is able to designate, through an operation on the operating unit 120 or through a touch operation on the region 138A, the function for which the control value is to be set. In the present embodiment, the explanation below will assume that the passenger compartment temperature adjusting function has been designated.

When operating a vehicle, for example, the user must concentrate on driving. Because of this, the user is unable to look at the screen 138 while driving. In this way, in a state wherein a touch operation is performed on the region 138A of a screen 138 that the user is unable to view, it will be difficult for the user to set passenger compartment temperature to an intended temperature.

Given this, in the present embodiment the control value setting program 102 is executed by the CPU 100A. Execution of the control value setting program 102 improves the ease of operations when setting control values for the various types of functions, including the temperature adjusting function described above. Because of this, even in a state wherein the user cannot look at the screen 138, the user can still set the control value to the intended value (for example, the intended temperature for the passenger compartment) easily. The improved ease of operations enables the user to concentrate on driving while adjusting the temperature, for example, correctly.

Figure 3:
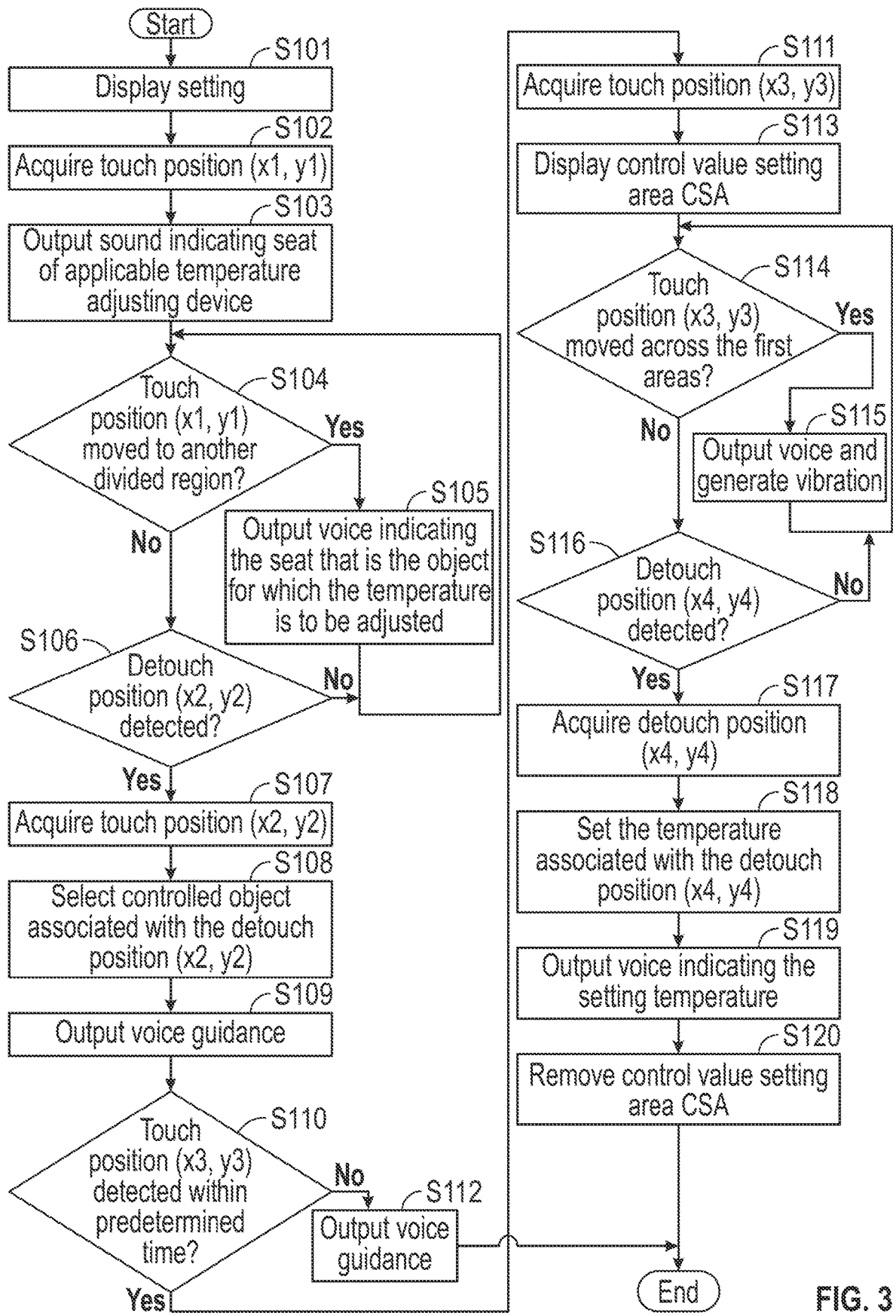
FIG. 3 is a flowchart showing processes of a control value setting program executed by a CPU in one embodiment.

FIG. 3 is a flowchart showing the control value setting program 102 that is executed by the CPU 100A in one embodiment. When a pressing force of no less than a predetermined value is detected by the pressure sensor 136, for example (that is, when the user forcefully touches the region 138A), execution of the process of the flowchart presented in FIG. 3 is started.

When a pressing force of no less than a predetermined value is detected by the pressure sensor 136, the control value setting program 102 controls the displaying unit 130 to display, on the screen 138, a settings screen for determining one single controlled object from among a plurality of controlled objects (Step S101).

Figure 4:
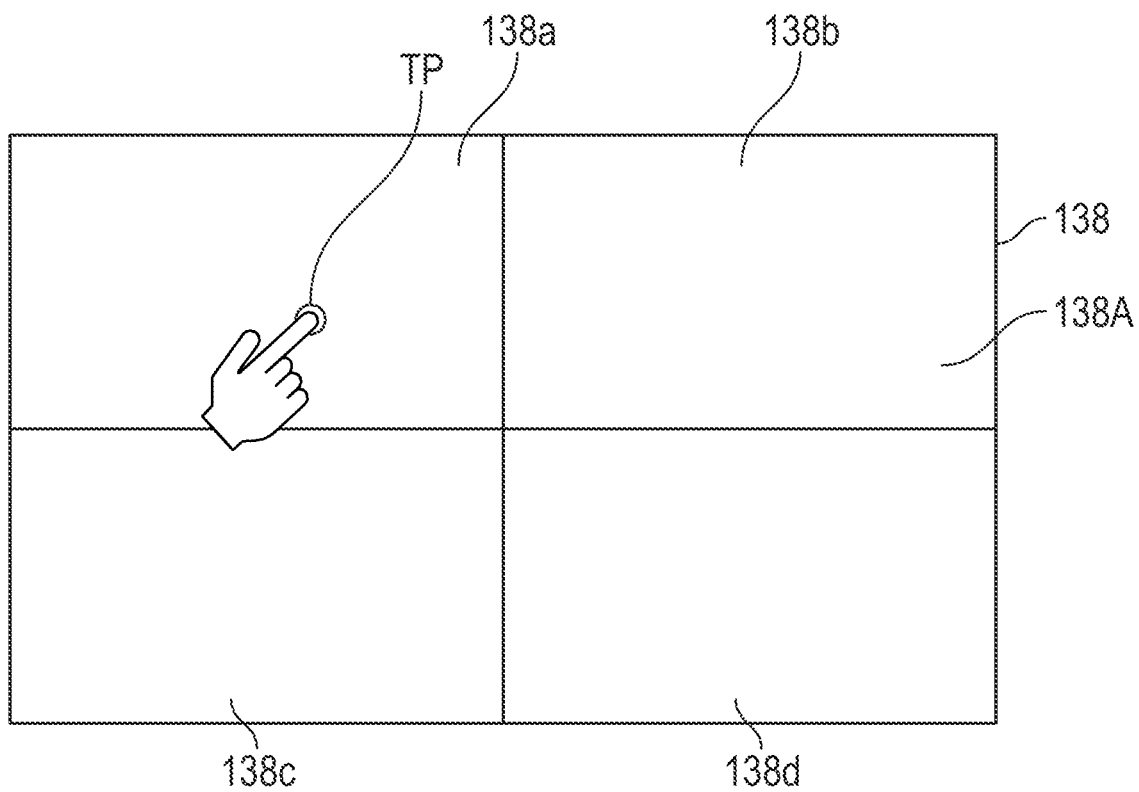
FIG. 4 is a diagram showing an example of a settings screen that is displayed on the screen of the touch panel display in Step S101 in FIG. 3.

FIG. 4 shows an example of a settings screen that is displayed in Step S101. As shown in FIG. 4, the settings screen is a screen wherein the area 138A is divided into four regions: a top left region 138a, a top right region 138b, a bottom left region 138c, and a bottom right region 138d. The four divided regions are displayed superimposed on the image that is displayed on the screen 138 (for example, the navigation image that is shown in FIG. 2). Note that the image for the four divided regions may be semitransparent. In this case, the image displayed on the screen 138 continues to be displayed, in the background of the image of the four divided regions.

The control value setting program 102 acquires, from the touch panel display 132, the touch position (x1, y1) in the region 138A wherein the pressing force of no less than the predetermined value is detected by the pressure sensor 136 (Step S102). Touch positions and detouch positions by the user on the region 138A are acquired as two-dimensional coordinates data.

The control value setting program 102 assigns correspondence between the four divided regions and respectively different controlled objects. By way of illustration, the vehicle in which the control value setting device 1 is installed is provided with temperature adjusting devices for each of the seats (that is, for respectively different controlled objects) so as to enable the temperature to be adjusted independently for each seat (the driver seat, the passenger seat, the back seat on the driver side, and the back seat on the passenger side). The top left region 138a is associated with the temperature adjusting device for the passenger seat. The top right region 138b is associated with the temperature adjusting device for the driver seat. The bottom left region 138c is associated with the temperature adjusting device for the back seat on the passenger side. The bottom right region 138d is associated with the temperature adjusting device for the back seat on the driver side. Note that in this example the explanation is for a case envisioning the steering wheel as being on the right. In the settings screen in FIG. 4, the locations of each of the seats in the passenger compartment match the locations of the individual divided regions in the settings screen. Specifically, because the driver seat and back seat on the driver side are positioned, respectively, on the front right side of the passenger compartment and the back right side of the passenger compartment, these are assigned as corresponding to the top right region 138b and bottom right region 138d. Because the passenger seat and back seat on the passenger side are positioned, respectively, on the front left side of the passenger compartment and the back left side of the passenger compartment, these are assigned as corresponding to the top left region 138a and bottom left region 138c. When the control value setting device 1 is installed in a vehicle wherein the steering wheel is on the left, the top left region 138a and bottom left region 138c may instead correspond respectively to the driver seat and the back seat on the driver side, and the top right region 138b and bottom right region 138d may correspond, respectively, to the passenger seat and the back seat on the passenger side.

The control value setting program 102 controls the audio outputting unit 140 to cause outputting, from the speaker 142, of audio relating to the temperature adjusting device that, corresponding to the divided region that includes the touch position (x1, y1) that was acquired in Step S102 (Step S103). The touch position TP in FIG. 4, for example is included in the top left region 138a. Because of this, audio relating to the temperature adjusting device for the passenger seat, which corresponds to the top left region 138a, is outputted from the speaker 142. The audio that is outputted indicates, for example, the seat for which a temperature adjustment is to be performed. In the example in FIG. 4, a voice pronouncing "Passenger seat" is outputted from the speaker 142.

The touch position (x1, y1) is moved through sliding the finger in a state wherein it touches the region 138A. The control value setting program 102 determines whether or not the touch position (x1, y1), acquired in Step S102, has moved to a position within another divided region (Step S104).

If the touch position (x1, y1) moves to position within another divided region (Step S104: YES), the control value setting program 102 controls the audio outputting unit 140 to output, from the speaker 142, audio regarding the temperature adjusting device that corresponds to the divided region that is arrived at (Step S105). The control value setting program 102 next returns processing to Step S104. If, for example, the touch position TP in FIG. 4 moves from the top left region 138a to the top right region 138b, a voice pronouncing "Driver seat" is outputted from the speaker 142.

Execution of the processes in Step S103 through S105 enables the user to know which seat it is for which the temperature adjusting device has been selected as the controlled object, without reading the screen 138.

The position at which the finger at the touch position (x1, y1) is removed from the region 138A (that is, that which the touch is released) is termed the "detouch position (x2, y2)." If there is no movement of the touch position (x1, y1) to a position within another divided region (Step S104: NO), the control value setting program 102 determines whether or not a detouch position (x2, y2) by the user on the region 138A has been detected by the touch panel display 132 (Step S106).

If a detouch position (x2, y2) is detected by the touch panel display 132 (Step S106: YES), the control value setting program 102 acquires this detouch position (x2, y2) (Step S107).

For example, when the finger of the user is detouched without having slid on the region 138A from the touch position TP shown in FIG. 4, the touch position TP (x1, y1) will be acquired as the detouch position (x2, y2). Moreover, if the finger of the user is detouched after having slid from the touch position TP, shown in FIG. 4, to another position within the divided region, that position will be acquired as the detouch position (x2, y2).

The detouch position (x2, y2) is the detouch position by the user on the region 138A prior to acquisition of a touch position (x3, y3) by the position acquiring unit 100a in Step S111, described below. That is, in Step S107, the CPU 100A that executes the control value setting program 102 operates as a pre-detouch position acquiring unit 100d for acquiring the detouch position (x2, y2) of the user on the region 138A prior to acquisition of the touch position (x3, y3) by the position acquiring unit 100a.

From among the temperature adjusting devices for the various seats, the control value setting program 102 selects, as the controlled object, the temperature adjusting device that corresponds to the divided region that includes the detouch position (x2, y2) (Step S108). For example, upon detouch of the finger without having slid on the region 138A from the touch position TP shown in FIG. 4, the temperature adjusting device for the passenger seat, which corresponds to the top left region 138a, is selected as the controlled object. In this way, in Step S108 the CPU 100A that executes the control value setting program 102 operates as a controlled object selecting unit 100e for selecting, from among a plurality of controlled objects, the controlled object that is associated with the detouch position (x2, y2) within the region 138A, acquired by the pre-detouch position acquiring unit 100d.

After the detouch position (x2, y2) has been acquired, the control value setting program 102 controls the audio outputting unit 140 to output predetermined voice guidance from the speaker 142 (Step S109). For example, voice guidance of "Please touch the screen to adjust the temperature" is outputted from the speaker 142. Note that when the finger of the user has detouched from the region 138A, the display on the screen 138 returns to its previous state (for example, the navigation image shown in FIG. 2).

A position within the region 138A that is touched within a predetermined time after acquisition of the detouched position (x2, y2) is termed the "touch position (x3, y3)." The control value setting program 102 determines whether or not a touch position (x3, y3) has been detected by the touch panel display 132 (Step S110).

If a touch position (x3, y3) is detected within a predetermined time after acquisition of the detouch position (x2, y2) (Step S110: YES), the control value setting program 102 acquires that touch position (x3, y3) (Step S111). In this way, in Step S111 the CPU 100A that executes the control value setting program 102 operates as a position acquiring unit 100a for acquiring the touch position (x3, y3) by the user on the touch operation-enabled region 138A within the screen 138.

If no touch position (x3, y3) is detected within the predetermined time after acquisition of the detouch position (x2, y2) (Step S110: NO), the control value setting program 102 controls the audio outputting unit 140 to output predetermined voice guidance from the speaker 142 (Step S112), and terminates the process in this flowchart. For example, the voice guidance of "Canceling temperature adjustment" is outputted from the speaker 142.

The control value setting program 102 controls the displaying unit 130 to display a control value setting area CSA within the region 138A (Step S113).

Figure 5:
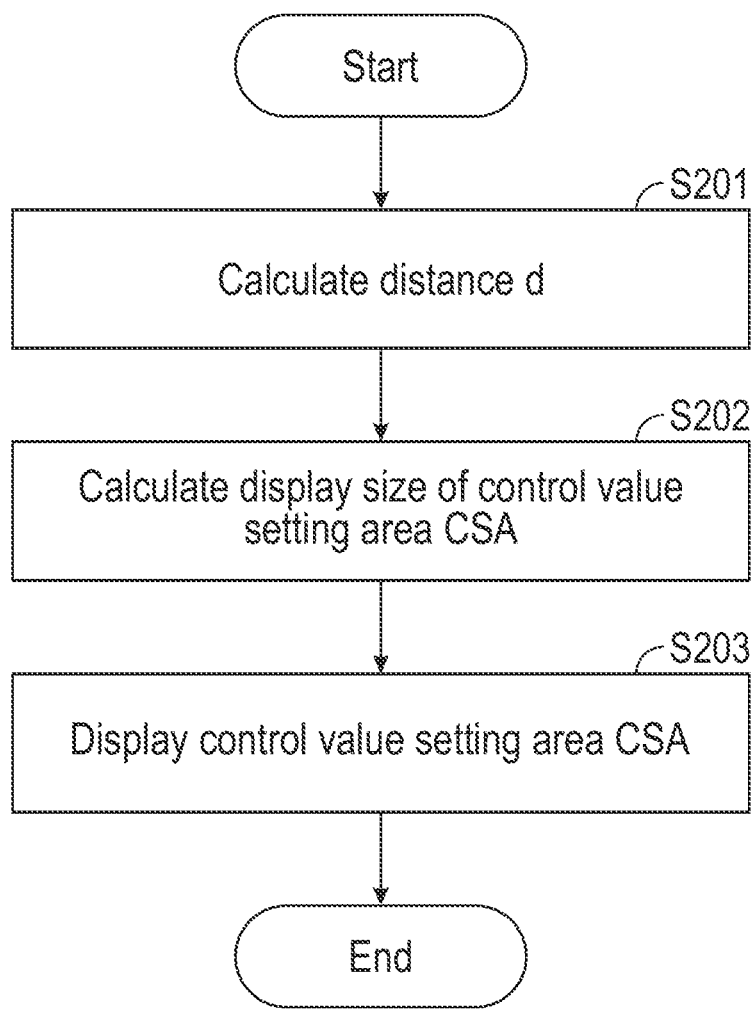
FIG. 5 is a flowchart showing the details of an area displaying process in Step S113 of FIG. 3.
Figure 6:
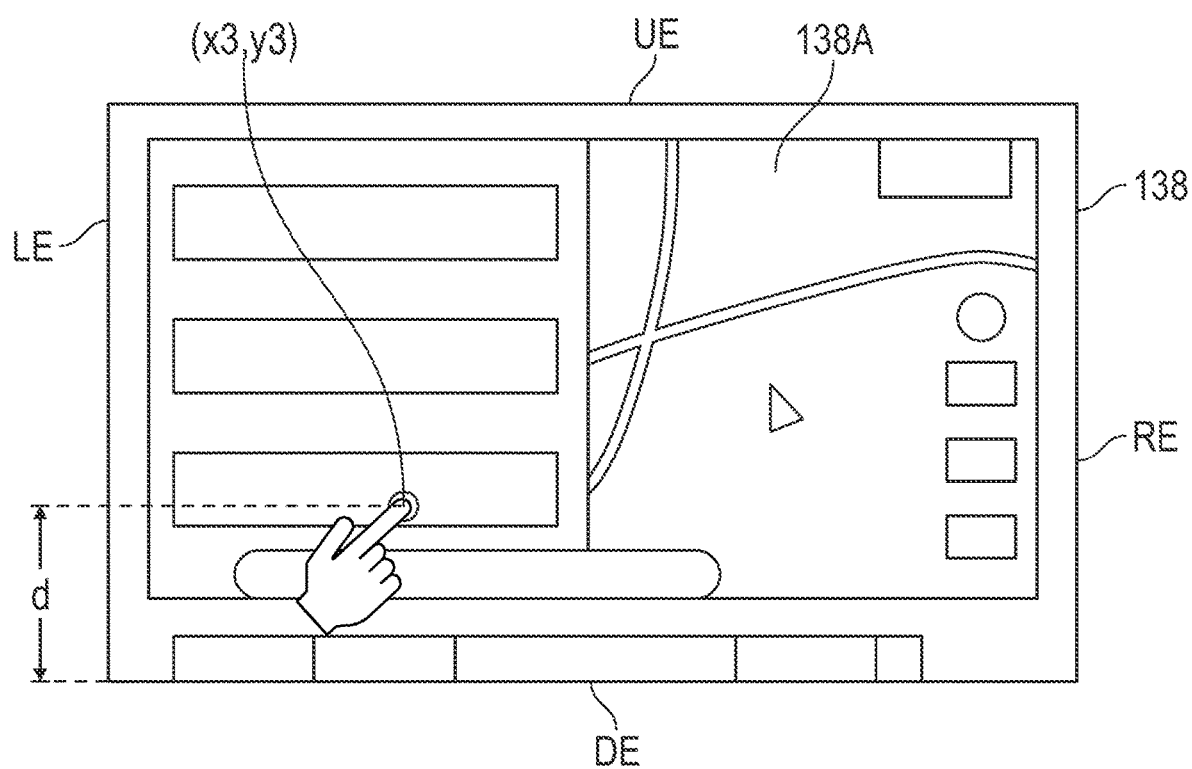
FIG. 6 is a diagram for supplementing the explanation of the area displaying process in Step S113 of FIG. 3.
Figure 7:
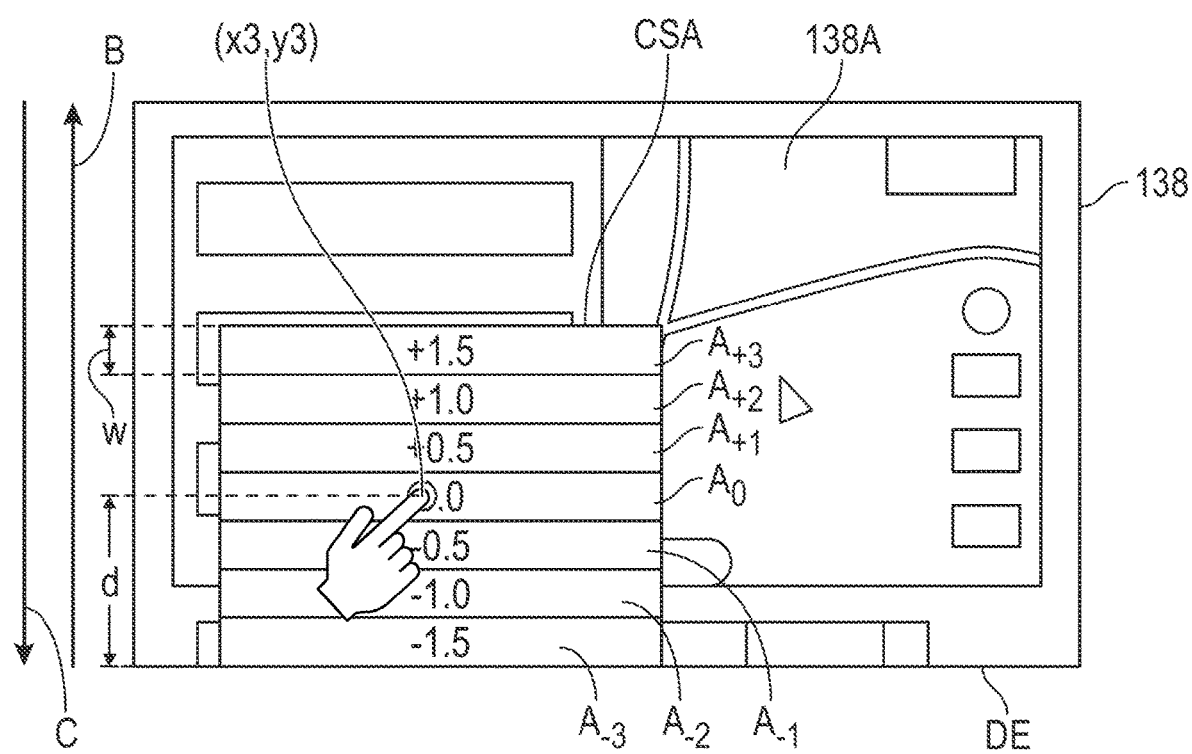
FIG. 7 is a diagram showing an example of a control value setting area that is displayed on the screen of the touch panel display in one embodiment.

FIG. 5 is a flowchart showing details of the area displaying process in Step S113. FIG. 6 is a diagram for supplementing the explanation of the area displaying process in Step S113. FIG. 7 is a diagram showing an example of a control value setting area CSA in the display in the screen 138.

As shown in FIG. 5, the control value setting program 102 calculates a distance d between the touch position (x3, y3) that was acquired in Step S111 and the end unit, among the end units that define the region 138A, that is nearest to the touch position (x3, y3) (Step S201). In the present embodiment, the entire region of the rectangular screen 138 is also the entirety of the region at 138A. Because of this, the end units that define the region 138A are the right edge RE, the left edge LE, the top edge UE, and the bottom edge DE of the screen 138. In the example in FIG. 6, the distance between the touch position (x3, y3) and the bottom edge DE is calculated as the distance d.

The control value setting program 102 calculates the display size of the control value setting area CSA (Step S202). In the present embodiment, the control value setting area CSA is a square, where each edge has a length that is twice the distance d that was calculated in Step S201.

The control value setting program 102 controls the displaying unit 130 to cause a control value setting area CSA of the control size that was calculated in Step S203 to be displayed within the region 138A at a position centered on the touch position (x3, y3) (Step S203). The control value setting area CSA is displayed superimposed on the image that is currently displayed (for example, the navigation image that is shown in FIG. 2). Note that the control value setting area CSA may be displayed semi-transparently so as to not interfere with readability of the navigation image, or the like, that is behind the control value setting area CSA.

In this way, a square control value setting area CSA wherein each edge has a length that is twice the distance d is displayed within the region 138A with the center position thereof at the touch position (x3, y3). In the example in FIG. 7, the bottom edge of the control value setting area CSA is displayed aligned with the bottom edge DE, which is nearest to the touch position (x3, y3), and the other three edges of the control value setting area CSA are displayed at positions within the region 138A that are away from the respective end units that define the region 138A. That is, the control value setting area CSA is displayed with the maximum size that fits within the region 138A while maintaining a predetermined shape (which here is a square). Through displaying the control value setting area CSA with a predetermined shape, the user will be able to carry out the touch operation on the control value setting area CSA with the operation feeling similar every time.

As shown in FIG. 7, the control value setting area CSA is partitioned into a plurality of first areas. In the present embodiment, the control value setting area CSA is partitioned into seven rectangular first areas: $A_{+3}$, $A_{+2}$, $A_{+1}$, $A_0$, $A_{-1}$, $A_{-2}$, and $A_{-3}$. The first area $A_0$ is displayed at the touch position (x3, y3). The first areas $A_{+1}$, $A_{+2}$, and $A_{+3}$ are displayed lined up in the direction of the arrow B (a direction that is either one predetermined direction or the direction that is opposite thereto, which, as shown in FIG. 7, is the direction toward the top of the screen), with the touch position (x3, y3) as the starting point. The first areas $A_{-1}$, $A_{-2}$, and $A_{-3}$ are displayed lined up in the direction of the arrow C (the other direction of the one predetermined direction or the direction that is opposite thereto, which, as shown in FIG. 7, is the direction toward the bottom of the screen), with the touch position (x3, y3) as the starting point.

The control value setting program 102 assigns correspondence between the seven first areas and respectively different control values. By way of illustration, the current control value (that is, the temperature that is currently set for the seat that is the controlled item) is assigned corresponding to the first area $A_0$ that is displayed at the touch position (x3, y3). Values that are larger than the current value are assigned to the three first areas $A_{+1}$, $A_{+2}$, and $A_{+3}$ that are lined up in the direction of the arrow B with the touch position (x3, y3) as the starting point. As an example, values of +0.5° C., +1.0° C., and +1.5° C., relative to the current setting temperature for the seat that is the controlled object, are assigned respectively to the first areas $A_{+1}$, $A_{+2}$, and $A_{+3}$. Values that are smaller than the current value are assigned to the three first areas $A_{-1}$, $A_{-2}$, and $A_{-3}$ that are lined up in the direction of the arrow C with the touch position (x3, y3) as the starting point. As an example, values of −0.5° C., −1.0° C., and −1.5° C., relative to the current setting temperature for the seat that is the controlled object, are assigned respectively to the first areas $A_{-1}$, $A_{-2}$, and $A_{-3}$.

In this way, in Step S201 through S203, the CPU 100A that executes the control value setting program 102, upon acquisition of the touch position (x3, y3) from the position acquiring unit 100a, operates as the area displaying unit 100b for displaying, within the region 138A, a control value setting area CSA that is partitioned into a plurality of first areas that correspond to respectively different control values, depending on the touch position (x3, y3) acquired within the region 138A. Through the processes in Step S201 through S203, the control value setting area CSA is displayed in the region 138A in a size that depends on the distance d between the touch position (x3, y3) and the edge, of the edges that define the region 138A, that is nearest to the touch position (x3, y3).

Returning to the flowchart of FIG. 3, the touch position (x3, y3) is moved by the user sliding the finger in a state wherein it is touching the control value setting area CSA. The control value setting program 102 determines whether or not the touch position (x3, y3) acquired in Step S111 has moved to cross between two adjacent first areas (Step S114).

The control value setting program 102 assigns correspondence between the seven first areas and respectively different voice and vibration patterns. By way of illustration, a voice that pronounces "No change" and a vibration pattern of "dit" (one short vibration) are assigned corresponding to the first area $A_0$. Additionally, for example, if the current setting temperature for the seat that is the controlled object is 25.5° C., a voice that pronounces "26° C." and a vibration pattern of "di-dit" (two short vibrations) are assigned corresponding to the first area $A_{+1}$. A voice that pronounces "26.5° C." and a vibration pattern of "di-di-dit" (three short vibrations) are assigned corresponding to the first area $A_{+2}$. A voice that pronounces "27° C." and a vibration pattern of "dah" (one long vibration) are assigned corresponding to the first area $A_{+3}$. A voice that pronounces "25° C." and a vibration pattern of "di-dit" (two short vibrations) are assigned corresponding to the first area $A_{-1}$. A voice that pronounces "24.5° C." and a vibration pattern of "di-di-dit" (three short vibrations) are assigned corresponding to the first area $A_{-2}$. A voice that pronounces "24° C." and a vibration pattern of "dah" (one long vibration) are assigned corresponding to the first area $A_{-3}$.

When the touch position (x3, y3) moves crossing between two adjacent first areas (Step S114: YES), the control value setting program 102 controls the audio outputting unit 140 to output, from the speaker 142, the voice that corresponds to the first area that has been reached, and also controls the vibrating unit 150 to cause the screen 138 to vibrate with the vibration pattern that corresponds to the first area that has been reached (Step S115). The control value setting program 102 next returns processing to Step S114. Note that in Step S115, either the voice or the vibration may be produced, instead of both.

Execution of the processes in Step S114 through S115 enables the user to know the control value selected by the slide operation (which here is the setting temperature), without reading the screen 138.

In this way, in Step S115 the CPU 100A that executes the control value setting program 102 operates as the generating unit 100f for generating a sound and/or vibration that depends on the first area that has been reached when the touch position (x3, y3) acquired by the position acquiring unit 100a moves crossing between two adjacent first areas.

The position within the control value setting area CSA at which the finger at the touch position (x3, y3) is removed from the region 138A (that is, that from which the touch is released) is termed the "detouch position (x4, y4)." The control value setting program 102 determines whether or not a position touched by the user in the control value setting area CSA (x4, y4) has been detected by the touch panel display 132 (Step S116).

If a detouch position (x4, y4) is detected by the touch panel display 132 (Step S116: YES), the control value setting program 102 acquires this detouch position (x4, y4) (Step S117). More specifically, if the detouch position detected by the touch panel display 132 is a position within the control value setting area CSA, the control value setting program 102 acquires that position as the detouch position (x4, y4). If the detouch position detected by the touch panel display 132 is a position outside of the control value setting area CSA, the control value setting program 102 acquires, as the detouch position (x4, y4), a position within the first area that is nearest to the detouch position.

The control value setting program 102 sets, in the temperature adjusting device of the controlled object that was selected in Step S108, the control value that corresponds to the first area that includes the detouch position (x4, y4) (Step S118).

In this way, in Step S118, upon acquisition of the detouch position (x4, y4) within a first area by the position acquiring unit 100a, the CPU 100A that executes the control value setting program 102 operates as the control value setting unit 100c for setting the control value that corresponds to the first area that includes the acquired touch position (x4, y4).

The control value setting program 102 controls the audio outputting unit 140 to output, from the speaker 142, a voice pronouncing the control value that has been set in Step S118 (which here is the setting temperature) (Step S119). Next the control value setting program 102 controls the displaying unit 130 to remove the control value setting area CSA from the screen 138 (Step S120). Through this, the display on the screen 138 is returned to its prior state (for example, the navigation image displayed in FIG. 2), and the process in this flowchart is terminated.

The seven first areas that partition the control value setting area CSA include parts that are lined up with uniform sizes w in one predetermined direction (the direction of the arrow B or of the arrow C). In the present embodiment, the seven first areas are rectangular areas that are arranged lined up in the direction of the arrow B (or the direction of the arrow C), and the size w in the direction of the arrow B (or the direction of the arrow C) is uniform. Because of this, there will be a constant relationship between the amount of sliding and the amount of the increase in the setting temperature when the user slides the finger in the direction of the arrow B, and a constant relationship between the amount of sliding and the amount of the decrease in the setting temperature when the user slides the finger in the direction of the arrow C. Because the setting temperature is increased or decreased by 0.5° C. each time the finger is slid by a given amount (the amount that is the size w) in the direction of the arrow B or the direction of the arrow C (that is, because the amount of change in the setting temperature will be constant), the user is able to increase or decrease the setting temperature with an operation that feels the same each time. This enables the user to set the temperature of the seat that is the controlled object to the intended temperature easily, even in a state wherein the screen 138 cannot be viewed.

The above is an exemplary embodiment. Embodiments described herein are not limited to the explanation set forth above, but rather may be modified in a variety of ways within the scope of the technical concept and idea of the present disclosure. For example, details of arbitrary combinations of embodiments that are explicitly illustrated in the Specification, and embodiments that are obvious, and the like, are included in embodiments of the present application.

While, in the embodiment set forth above, the control value setting area CSA was partitioned into seven first areas, the structure of the control value setting area CSA is not limited thereto. The control value setting area CSA may be partitioned into two to six first areas, or may be partitioned into eight or more first areas.

The display shape of the control value setting area CSA shown in FIG. 7 is no more than an example. A variety of display shapes may be considered for the control value setting area CSA.

Figure 8:
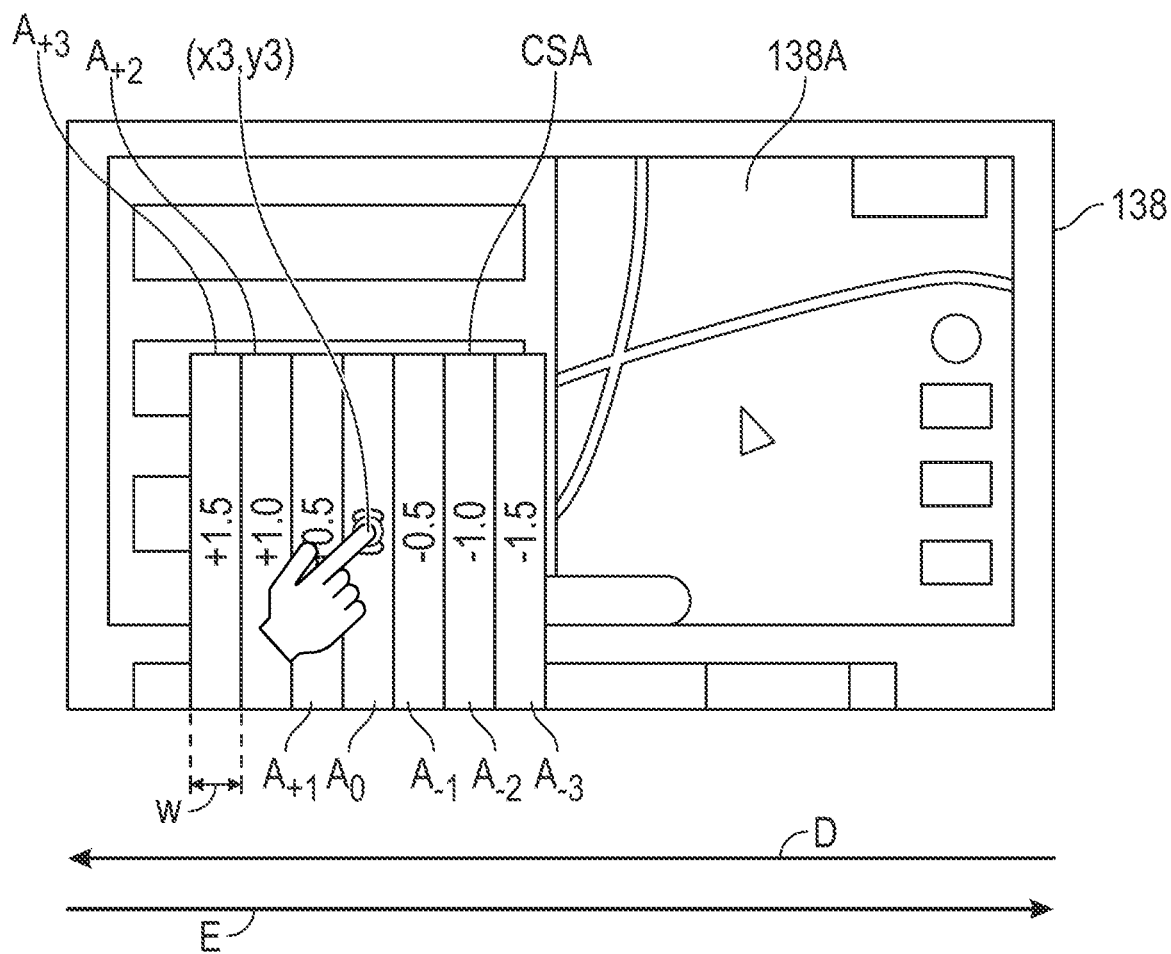
FIG. 8 is a diagram showing an example of a control value setting area that is displayed on the screen of the touch panel display in a first modified example.

FIG. 8 is a diagram showing an example of a control value setting area CSA that is displayed on the screen 138 in a first modified example. In the first modified example as well, the control value setting area CSA is partitioned into seven rectangles: first areas $A_{+3}$, $A_{+2}$, $A_{+1}$, $A_0$, $A_{-1}$, $A_{-2}$, and $A_{-3}$.

In Modified Example 1 as well, the first area $A_0$ is displayed at the touch position (x3, y3). The first areas $A_{+1}$, $A_{+2}$, and $A_{+3}$ are displayed lined up in the direction of the arrow D (a direction that is either one predetermined direction or the direction that is opposite thereto, which, as shown in FIG. 8, is the direction toward the left of the screen), with the touch position (x3, y3) as the starting point. The first areas $A_{-1}$, $A_{-2}$, and $A_{-3}$ are displayed lined up in the direction of the arrow E (the other direction of the one predetermined direction or the direction that is opposite thereto, which, as shown in FIG. 8, is the direction toward the right of the screen), with the touch position (x3, y3) as the starting point.

In the first modified example, the seven first areas that partition the control value setting area CSA include parts that are lined up with uniform sizes w in one predetermined direction (the direction of the arrow D or of the arrow E). Specifically, the seven first areas are rectangular areas that are arranged lined up in the direction of the arrow D (or the direction of the arrow E), and the size w in the direction of the arrow D (or the direction of the arrow E) is uniform. Because of this, there will be a constant relationship between the amount of sliding and the amount of the increase in the setting temperature when the user slides the finger in the direction of the arrow D, and a constant relationship between the amount of sliding and the amount of the decrease in the setting temperature when the user slides the finger in the direction of the arrow E. Because the setting temperature is increased or decreased by 0.5° C. each time the finger is slid by a given amount (the amount that is the size w) in the direction of the arrow D or the direction of the arrow E (that is, because the amount of change in the setting temperature will be constant), the user is able to increase or decrease the setting temperature with an operation that feels the same each time in the first modified example as well.

Figure 9:
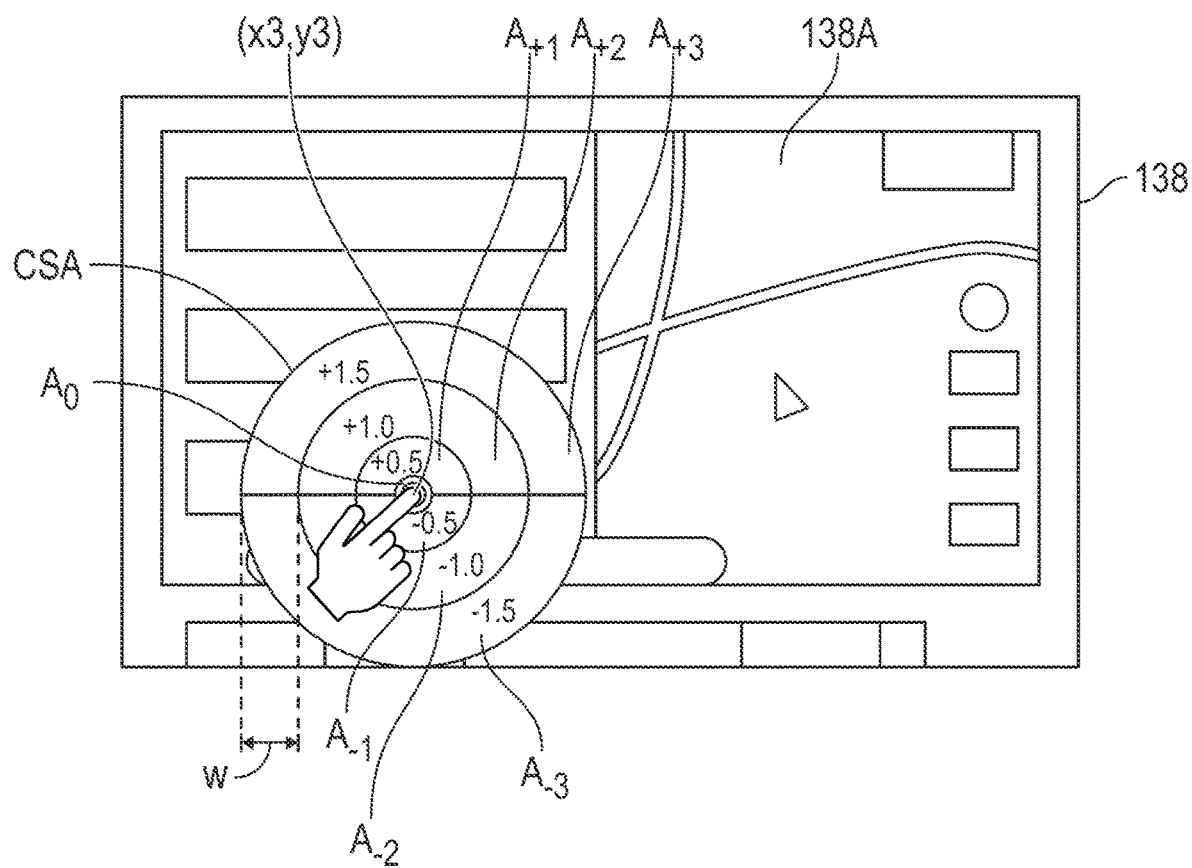
FIG. 9 is a diagram showing an example of a control value setting area that is displayed on the screen of the touch panel display in a second modified example.

FIG. 9 is a diagram showing an example of a control value setting area CSA that is displayed on the screen 138 in a second modified example. In the second modified example, the control value setting area CSA is partitioned into total of seven first areas: a circular first area at $A_0$ and first areas $A_{+3}$, $A_{+2}$, $A_{+1}$, $A_{-1}$, $A_{-2}$, and $A_{-3}$ that are semicircular band shapes arranged around the first area $A_0$. The first areas $A_{+1}$, $A_{+2}$, and $A_{+3}$ are arranged so as to surround 180° around the top half of the first area $A_0$. The first areas $A_{-1}$, $A_{-2}$, and $A_{-3}$ are arranged so as to surround 180° around the bottom half of the first area $A_0$.

In Modified Example 2, the control value setting area CSA is displayed within the region 138A so that the touch position (x3, y3) will be the position of the center of the first area $A_0$. The first area $A_0$ and the six circular band-shaped first areas are arranged concentrically. Moreover, the widths of the six circular band-shaped first areas are the width w. The circular first area $A_0$ has a diameter that is equal to the width w. Because of this, in Modified Example 2, the seven first areas that partition the control value setting area CSA have equal sizes w in all directions that pass through the touch position (x3, y3). That is, in Modified Example 2, the seven first areas include parts with equal sizes w, lined up in a plurality of directions.

In Modified Example 2, the setting temperature will be increased or decreased by 0.5° C. increments (that is, the amount of change in the setting temperature will be constant), when the user slides the finger by the amount w in any direction with the touch position (x3, y3) as the starting point, enabling the user to increase or decrease the setting temperature with the operation feeling the same every time.

In Modified Example 2, there is no constraint on the direction of sliding of the finger when the amount of change of the setting temperature is constant. Because of this, the user is able to set even more easily, to the intended temperature, the temperature of the seat that is the controlled object, even in a state wherein the screen 138 cannot be viewed.

In this way, cases wherein the plurality of first areas includes parts that are lined up with equal sizes in a plurality of directions are also included in the present disclosure.

EXPLANATION OF REFERENCE NUMERALS

1: Control Value Setting Device
100: Controlling Unit
100A: CPU
100B: RAM
100C: ROM
100D: Input/Output Port
100*a*: Position Acquiring Unit
100*b*: Area Displaying Unit
100*c*: Control Value Setting Unit
100*d*: Pre-detouch Position Acquiring Unit
100*e*: Controlled Object Selecting Unit
100*f*: Generating Unit
102: Control Value Setting Unit
110: Communication Interface Unit
120: Operating Unit
130: Displaying Unit
132: Touch Panel Display
134: Display Driver
136: Pressure Sensor
140: Audio Outputting Unit
142: Speaker
144: Speaker Driver
150: Vibrating Unit
152: Vibrator
154: Vibrator Driver

The invention claimed is:

1. A control value setting device for setting a control value of a plurality of different control values for controlling a predetermined function, the control value setting device comprising:
a touch panel that acquires from a user a touch position and a detach position with respect to a touch operation-enabled region within a screen of the touch panel,
a pre-detouch position acquiring unit that acquires a detouch position of a user on the touch operation-enabled region prior to acquisition of the touch position by the touch panel, a controlled object selecting unit that selects, from a plurality of controlled objects of the predetermined function, a controlled object associated with the detouch position acquired by the pre-detouch position acquiring unit, an area display unit that, when the touch position is acquired by the touch panel, displays a control value setting area partitioned into a plurality of first areas corresponding to the different control values in an area around the acquired touch position, a control value setting unit that sets the control value associated with one of the first areas that includes the acquired detach position when the detach position is acquired by the touch panel, wherein:

the plurality of first areas includes parts lined in at least a predetermined direction in an equal size; and the control value setting unit acquires the touch position in response to the touch panel acquiring the touch position within a predetermined time after the acquisition of the detouch position, and sets the control value for the controlled object selected by the controlled object selecting unit.

2. The control value setting device of claim 1, wherein:

the plurality of first areas include (a) a first area that is displayed at the touch position, (b) one or more first areas that are displayed lined in the predetermined direction, with the touch position as the starting point, and (c) one or more first areas that are lined in a direction that is opposite of the predetermined direction, with the touch position as the starting point, the current value for the control value is associated with the first area that is displayed at the touch position, a value that is greater than the current value is associated with the one or more first areas lined in the predetermined direction, a value that is less than the current value is associated with the one or more first areas lined in the direction that is opposite of the predetermined direction.

3. The control value setting device of claim 1 further comprising:

a generation unit that generates at least one of a sound or a vibration corresponding to the first area containing the touch position, when the touch position acquired by the touch panel moves across the two adjacent first areas.

4. A non-transitory computer-readable medium including instructions stored thereon that, when executed by at least one processor, cause a computer to perform operations for setting a control value for controlling a predetermined function, the operations comprising:

acquiring a detouch position of a user on a touch operation-enabled region within a screen;

selecting, from a plurality of controlled objects of the predetermined function, a controlled object associated with the detouch position;

acquiring a touch position, within a predetermined time after the acquisition of the detouch position, and a detach position of a user on the touch operation-capable region within the screen;

displaying in the touch operation-capable region, when the touch position is acquired, a control value setting area that is partitioned into a plurality of first areas corresponding to different control values;

setting the control value associated with the first area that includes the acquired detach position when the detach position is acquired;

setting the control value for the selected controlled object associated with the detouch position, wherein:

the plurality of first areas includes parts that are lined up with equal sizes in at least one predetermined direction.

5. The control valve setting device of claim 1, wherein:

at least one of the first areas is displayed in the touch operation-enabled region with a dimension that depends on a distance between the touch position and an end unit of the touch operation-enabled region that is nearest to the touch position, the end unit being among a plurality of end units that define the touch operation-enabled region.

6. The control value setting device of claim 1, wherein the control value setting unit plays an audio guidance and cancels the setting of the control value when the touch position is not acquired by the control value setting unit within the predetermined time after the acquisition of the detouch position.

* * * * *